United States Patent [19]

Rait et al.

[11] 4,453,154
[45] Jun. 5, 1984

[54] ALTITUDE MONITOR

[75] Inventors: Joseph M. Rait, Buffalo; David Dhanens, Cheektowaga, both of N.Y.

[73] Assignee: Tech Nomadic Corporation, Del.

[21] Appl. No.: 293,404

[22] Filed: Aug. 14, 1981

[51] Int. Cl.³ .................. G08B 23/00; G08B 21/00; G01L 7/12
[52] U.S. Cl. .................. 340/970; 200/83 N; 200/83 S; 73/387; 340/626
[58] Field of Search .......... 340/27 AT, 27 NA, 27 R, 340/626, 815.21, 326, 611, 614, 29; 73/387; 200/83 A, 83 N, 83 S

[56] References Cited
U.S. PATENT DOCUMENTS 3,281,783 10/1966 Adams ............................. 340/326
3,392,379 7/1968 Thomason et al. ............ 340/815.21
3,829,640 8/1974 Taylor ............................. 200/83 N
3,852,711 12/1974 Greene ............................. 73/387
3,911,393 10/1975 Biggs ............................. 340/626

*Primary Examiner*—James J. Groody
*Attorney, Agent, or Firm*—E. Herbert Liss

[57] ABSTRACT

An apparatus to continuously monitor a preset altitude for a pilot of an aircraft. It senses a change in altitude and an audible as well as a visible alarm tells the pilot that he has deviated from his preset altitude by a given height. Increase in altitude is signaled by a high pitch tone and by a yellow light while a decrease in altitude is signaled by a low pitch tone and a red light. The invention can also be used to warn a small boat operator of a pressure drop.

7 Claims, 2 Drawing Figures

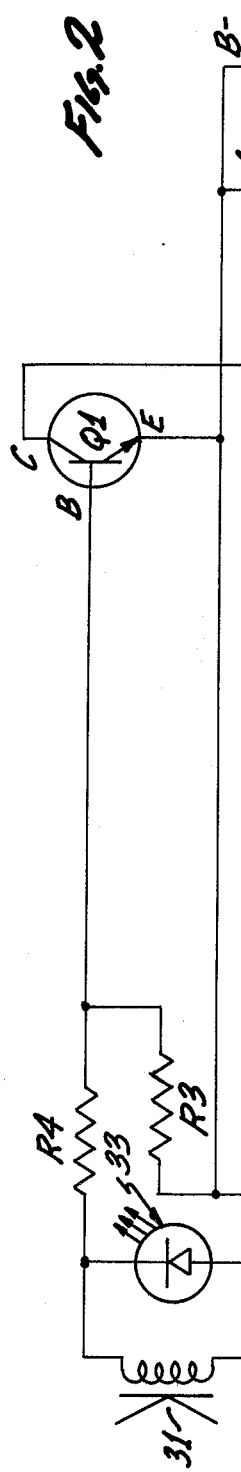

ALTITUDE MONITOR

BACKGROUND OF THE PRESENT INVENTION

All aircraft are equipped with altimeters which have various degrees of sophistication. The smaller aircraft that are generally flown for recreation as well as for business have the most unsophisticated instrumentation. Generally, the altimeter in most light aircraft is a simple barometric device which senses altitude by the linear expansion of an evacuated metal bellows fastened to a gear train that revolves a pointer. As the aircraft rises, the external pressure decreases and the evacuated metal bellows expands outward correspondingly. These altimeters may be compensated to account for the ambient temperature and are usually adjustable by the pilot to compensate for local barometric pressure. Much more complicated altitude sensing devices are used on larger aircraft but the majority of light aircraft use simple systems similar or identical to the one described above.

When a pilot flies an aircraft he constantly monitors the altitude for a number of reasons, all having to do with safety. In controlled airways, the FAA assigns distinct altitudes to aircraft and these altitudes depend on the compass heading of the individual aircraft. This assignment, known by all pilots, prevents collisions by aircraft which may be occupying or crossing over the same geographic location at the same time. Also, aircraft flight controllers may assign a particular altitude and heading to an individual aircraft so as to prevent collisions and to assure safety. In addition, it may be necessary to fly above a minimum height to avoid collision with mountains, buildings and structures such as radio towers etc.

The pilot should be able to improve the safety of flying if he could devote his visual senses more fully to other instruments, to keeping a better watch for other aircraft and for navigation. This is especially the case at night and while flying under instrument or marginal conditions and when in busy airspace near an airport.

Therefore, it is the object of this invention to relieve the pilot of the constant necessity of monitoring the altimeter once he has reached an acceptable altitude. The inventors have built and tested a number of different models of this invention and have found that the aircraft pilot can take this portable self-contained invention with him on any aircraft and use it in conjunction with the aircraft's built in altimeter to reduce the instrument monitoring requirements.

These and other objects and advantages attained by the invention will become more fully apparent in the description of a preferred embodiment of the invention which follows below.

BRIEF DESCRIPTION OF THE DRAWINGS

FIG. No. 1 is a schematic cross section of the invention.

FIG. No. 2 is an electrical schematic of the invention.

DETAILED DESCRIPTION OF THE PREFERRED EMBODIMENT

Figure 1:
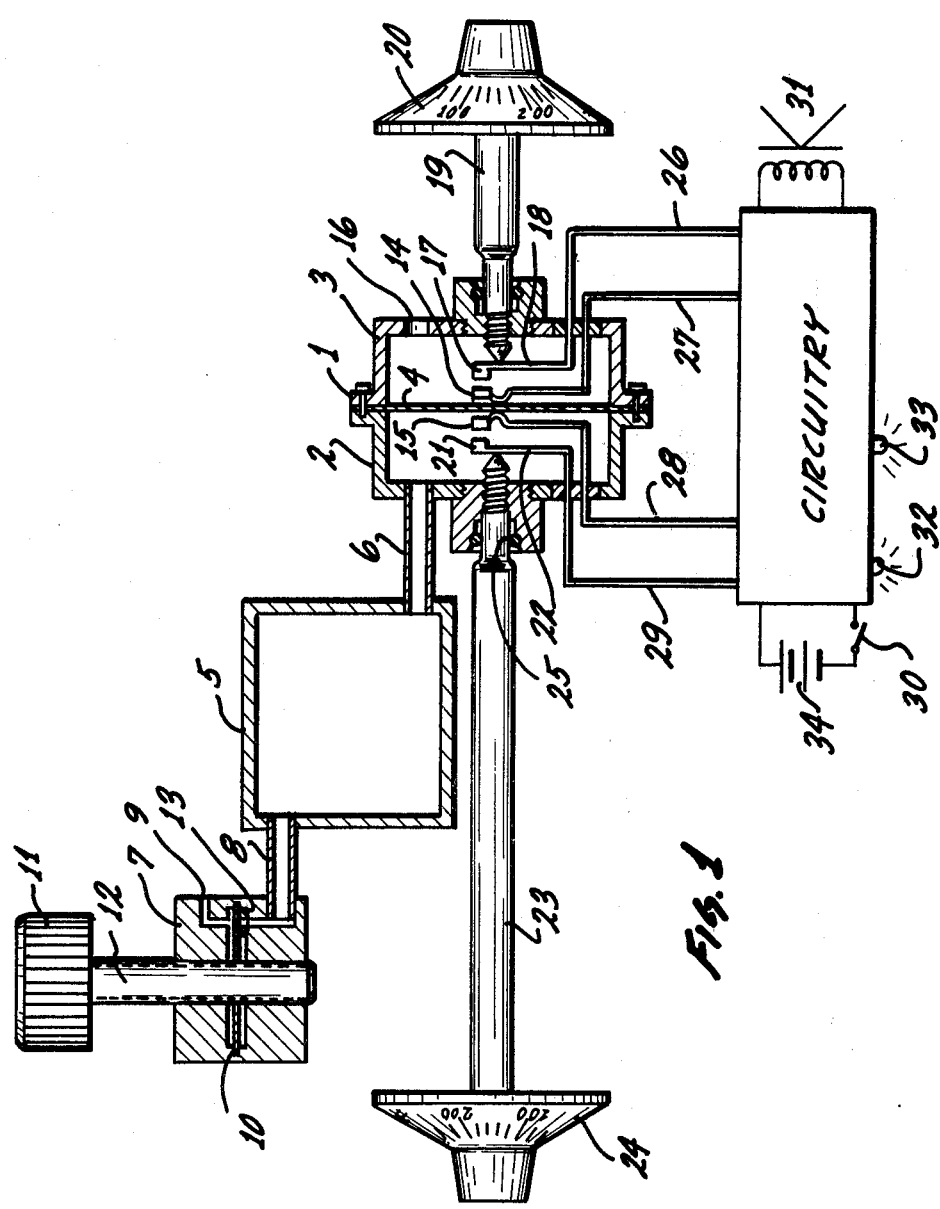

Referring to FIG. No. 1, a schematic cross section of the invention, a sealed chamber, 1 is divided into two sealed chambers. On the left side is a chamber, 2 which is separated from the right side chamber, 3 by a flexible diaphragm, 4. A reference chamber, 5 is connected to chamber number 2 by a passage, 6. This acts to greatly increase the relative volume of chamber number 2 with respect to chamber number 3. A separate reference chamber such as this is not required because chamber number 2 can be made large enough but was used by the inventors to "tune" the resonant frequency of the system. Chamber number 5 is connected to valve, 7 by a passage, 8. Valve, 7 acts to open or close communication of chambers numbered 5 and 2 with the ambient atmosphere through passage, 9 when the pilot turns a perforated disc, 10 connected to knob, 11 by shaft, 12. A seal, 13 prevents leakage of air past the disc. The valve allows flow between passages number 8 and number 9 when the hole in disc, 10 is aligned with passage number 9. When the disc is turned so that the hole is facing away from passage number 9, passage number 8 is sealed by the valve.

Attached to each side of the flexible diaphragm, 4 are two electrical contacts. Contact, 14 is on the right side of the diaphragm in chamber number 3 and contact, 15 is on the left side located within chamber number 2. When the diaphragm moves, the contacts move with it. The contacts may be electrically joined or isolated from each other. Chamber number 3 is vented to the atmosphere by means of opening, 16. A contact, 17 is held by a cantilever spring, 18 against the face of an adjustment screw, 19 which is turned by a knob, 20. The screw, 19 meshes with threads joined to chamber number 3. A contact, 21 is held by a cantilever spring, 22 against the face of an adjustment screw, 23 which is turned by a knob, 24. A seal, 25 prevents leakage of air past the threads of the adjustment screw, 23 which meshes with threads joined to chamber number 2. The contacts, 14, 15, 17 and 21 (in this embodiment) are all electrically isolated from the diaphragm, shafts and chambers. Electrical leads, 26, 27, 28 and 29 connect the contacts to the proper circuitry.

The invention operates as follows. When the pilot reaches an altitude that he wishes to maintain, he turns the knob, 11 on valve, 7 to admit ambient air at ambient pressure to chambers numbered 5 and 2. He also closes switch, 30 to energize the circuitry. This equalizes the pressure to chamber number 2 with the pressure in chamber number 3 which is always open to ambient air by means of passage, 16. The diaphragm, 4 centers itself and no electrical contact is made between the contacts. All circuits are open. The pilot then closes passage, 9 by rotating knob, 11 to the closed position. This rotates a hole in disc, 10 out of line with the hole in the seal, 13 and passage, 9. Chambers numbered 5 and 2 are now sealed at the ambient pressure at the desired altitude. The pilot then rotates knob, 24 to advance screw, 23 into the threads. This pushes contact, 21 against the preloaded spring, 22 and reduces the gap between contact, 21 and contact, 15 to zero at which time the circuitry is energized through wires, 28 and 29. The circuitry causes an audible tone to be generated by the speaker, 31 and a red warning light, 32, comes on. The pilot then turns knob, 24 counterclockwise to control the gap between contact, 15 and contact, 21. Divisions on the knob give approximate altitude settings that correspond to the gap. The pilot can adjust the gap precisely by reducing the altitude of the aircraft by the correct negative increment measured on the aircraft altimeter and then setting the gap to just make contact at that point.

The pilot sets the gap for positive increments of altitude in a similar manner using knob, 20 to close the circuit with contacts, 14 and 17 at the proper altitude and then backing out knob, 20 to the proper gap as indicated on the knob or as determined by climbing the aircraft to the proper increment as measured on the aircraft altimeter.

The altitude monitor works in the following manner after setting valve, 11. At the desired altitude, there is no contact between contacts numbered 15 and 21 or between contacts numbered 14 and 17. The diaphragm is centered as illustrated in FIG. No. 1. As the aircraft loses altitude, the increase in ambient pressure at the lower altitude enters chamber number 3 through opening, 16. This acts on the surface of diaphragm, 4 and causes a net force which moves the diaphragm to the left because the balancing pressure in chamber number 2 is that of the reference altitude hence lower than that in chamber number 3. As the altitude decreases to the point that the differential pressure across the diaphragm reduces the preset gap between contacts numbered 15 and 21 to zero, electrical contact is made and the circuit between wires, 28 and 29 is closed to energize the low altitude warning sound on the speaker and cause the red warning light to glow. When the aircraft climbs, the action is reversed. As the aircraft rises above the reference altitude, pressure in chamber number 2 becomes greater than the pressure in chamber number 3 and the diaphragm moves to the right until contact number 14 meets contact number 17 which closes the circuit between wires, 26 and 27 and energizes the circuitry which causes the high altitude warning to sound from the speaker and causes the yellow high altitude warning light, 33 to glow. Alternatively, the knob and adjusting screw can be used to apply variable spring pressure against the diaphragm by pressing a spring (not shown) against the diaphragm. In more simplified versions of the invention, the two colored lights can be eliminated or can be replaced by a single light. Also, it is possible to use a single audio tone to indicate a positive or negative altitude change.

Referring now to FIG. No. 2, the electrical circuitry developed by the inventors is shown in schematic form. A three volt battery, 34 is used to power the system. Switch, 30 is used by the pilot to energize the system or to turn it off when not in use.

When contact, 14 is connected to contact, 17 a 150 $H_z$ tone is emitted by speaker, 31 and the yellow light, 33 flashes. Both the speaker and light are pulsed at three pulses per second to alert the pilot that altitude is increasing beyond the preset margin. When contact, 15 is connected to contact, 21, the speaker emits a 150 $H_z$ tone and the red light, 32 flashes. In this case the speaker and light are pulsed at 0.75 pulses per second to alert the pilot of a negative altitude change.

In the case where the preset increment of altitude is exceeded, the tone and light continue to signal the pilot until he comes back to the proper altitude or turns the device off.

FIG. No. 2 lists the components that were used by the inventors to fabricate the experimental units. Standard available electrical hardware was used. The invention is quite small and is approximately the size of a common flashlight. It can be reduced in size at no loss or change in effectivity.

The advantage of the invention is that it is a portable and inexpensive safety item that a pilot can take with him. Because no connection to the aircraft is required, it can be used on any rented aircraft with no installation. The unit can be hung from an instrument knob by a cord or can be held to the dash by a suction cup or tape. No claim is made for any particular method of encasing the invention or of mounting it because the configuration and mounting do not affect its utility or operation. It may actually be fixed to the aircraft instrument panel and configured to operate from the aircraft electrical power system but its principle of operation remains the same.

FIG. No. 1 illustrates the stationary switches as being on opposite sides of the diaphragm but it is possible to obtain the same action while physically locating both switches on the same side of the diaphragm. The fundamental idea is to cause closure of one switch when the diaphragm responds to an increase in ambient pressure and to close a different switch when the diaphragm responds to a decrease in ambient pressure.

The invention may also be utilized by small craft operators to warn them of sudden chambers in barometic pressure. Because only a dropping barometer indicates a storm, the invention can be simplified for use as a warning device by omitting the circuitry and adjustments that are used to indicate a decrease in altitude. Referring to FIG. No. 1, contacts numbered 15 and 21 and adjustment screw, 23 and knob, 24 could be omitted along with circuitry associated with them. Thus, the invention can be used to warn a small craft operator about a drop in barometric pressure and impending winds or storm. This would be a valuable safety device to fishermen and small craft operators who normally do not use a barometer. Because it is self-contained and portable, fishermen and other small craft sailors could take the unit with them whenever they go out in rented boats as well as in their own craft. The sailor would close switch, 30 and open valve, 7 when he leaves the dock to allow ambient pressure to enter chamber, 2. He would then close valve, 7 to seal chamber, 2. Screw, 19 would be advanced into chamber, 3 by the knob, 20 until electrical contact is made between contacts numbered 14 and 17. The circuitry means signals the sailor that the system is working and gives him a zero point. He then backs off kob, 20 to a preset interval which corresponds to a significant drop in atmospheric pressure. When the atmospheric pressure falls to that predetermined value, the contacts close the electrical circuit and the warning means signals the sailor that a storm may be impending.

In summary, the invention is an altitude monitoring apparatus comprising: a diaphragm actuated electrical switch means; one side of said diaphragm is exposed to ambient air pressure while the other side of said diaphragm is exposed to a reference pressure in a chamber isolated from the atmosphere by a manually operated valve; said electrical switch means being closed or opened in response to differential pressure across said diaphragm caused by changes in altitude; said closure or opening of said switch means at a preset altitude change causing electrical circuitry means to signal the pilot by signaling means and said switch means closure altitude sensitivity increment being adjustable by a manual adjusting means.

The switch means may comprise a single pole double throw, center off electrical switch.

Altitude or pressure increments may be controlled by one or more knob operated screws that changes the motion required by the diaphragm that operates the switch means.

The invention can also be used to warn sailors about a drop in ambient atmospheric pressure which operates the invention as would a decrease in altitude.

While only one embodiment of the invention has been described in detail herein, various changes may be made without departing from the scope of the invention.

What is claimed is:

1. A self contained barometric instrument manually settable, in situ, in accordance with any prevailing ambient reference pressure to detect and signal a manually adjustable deviation from the ambient reference pressure; comprising a body, a single diaphragm dividing said body into first and second chambers completely sealed from each other, operator accessible and manually manipulatable valve means for selectively effecting when in open position and interrupting exposure when in closed position of said first chamber, in situ, to the ambient reference pressure, vent means for continuously exposing said second chamber to ambient pressure, a signal device for alerting an operator to a preselected deviation from the reference pressure, an electrical, battery operated, signal circuit for energizing said signal device, electrical switch contacts for making and breaking said signal circuit responsive to deflection of said diaphragm caused by differential pressure thereacross, a first screw type axially movable shaft operatively engaging said contacts for adjusting the sensitivity of said contacts to the deflection of said diaphragm, a first knob on said first shaft for facilitating manual actuation, indicia positioned at said first knob for calibrating the pressure deviation to which the contacts respond, whereby a change in ambient pressure effects displacement of said diaphragm when said valve means is in closed position to thereby energize said signal circuit activating said signal device.

2. A self contained barometric instrument according to claim 1 wherein said electrical switch contacts include a first pair of contacts in said first chamber and a second pair of contacts in said second chamber, said first pair of contacts being responsive to a positive deviation from the reference pressure and said second pair of contacts being responsive to a negative deviation from the reference pressure.

3. A self contained barometric instrument according to claim 2 wherein said first axially movable shaft engages a contact of said first pair of contacts.

4. A self contained barometric instrument according to claim 3, including a second screw type axially movable shaft engaging a contact of said second pair of contacts for adjusting the sensitivity of said second pair of contacts to the deflection of said diaphragm effected by a negative deviation from the reference pressure, a second knob on said second shaft for facilitating manual actuation, and indicia at said second knob for calibrating the pressure deviation to which said second pair of contacts respond.

5. A self contained barometric instrument according to claim 2 wherein said signal device emits a first kind of operator perceptible signal when energized in response to a positive deviation from ambient pressure and a second kind of signal, readily distinguishable from said first kind of signal when energizead in response to a negative deviation from ambient pressure.

6. A method of alerting an aircraft operator to a change in altitude comprising the steps of attaining a desired altitude by referral to an altitude determination source, venting one chamber of a dual chamber barometric instrument to the prevailing ambient reference pressure on a differential pressure switch having adjustable sensitivity to variation from pressure at a prevailing ambient reference pressure, closing said one chamber from ambient air pressure, adjusting said switch to energize said alarm at said reference pressure, backing off said sensitivity of said switch to interrupt energization of such alarm, decreasing altitude a preselected distance, adjusting a first pair of contacts of said switch to energize said alarm at said decreased altitude, increasing altitude to a preselected distance above said desired altitude, adjusting a second pair of contacts in the other chamber of said barometric instrument to engage said alarm at said increased altitude, returning to the desired altitude and continuing level flight whereby a positive or negative deviation from the desired altitude will effect a change in barometric pressure to cause the alarm to be activated.

7. A method of alerting the operator of watercraft to a decrease in atmospheric pressure forecasting an imminent storm comprising the steps of venting one chamber of a dual chamber differential pressure switch in situ, the other chamber being continuously open to ambient air pressure, a pair of movable contacts disposed within said other chamber and being in circuit with an alarm, closing the vent to establish a reference pressure, setting said pair of contacts in engagement to activate the alarm, backing off said pair of contacts to effect activation of the alarm circuit at a selected lower pressure whereby a precalibrated drop in pressure will activate the alarm to alert the operator of imminent storm conditions.

* * * * *